United States Patent
Hanes, Jr.

(10) Patent No.: US 7,405,183 B2
(45) Date of Patent: *Jul. 29, 2008

(54) METHODS AND COMPOSITIONS FOR CROSSLINKING POLYMERS WITH BORONIC ACIDS

(75) Inventor: Robert E. Hanes, Jr., Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 488 days.

This patent is subject to a terminal disclaimer.

(21) Appl. No.: 10/884,853

(22) Filed: Jul. 2, 2004

(65) Prior Publication Data

US 2006/0003900 A1 Jan. 5, 2006

(51) Int. Cl.
*C09K 8/58* (2006.01)
*C09K 8/68* (2006.01)
(52) U.S. Cl. .......... 507/261; 507/263; 507/264; 507/273; 166/308.1
(58) Field of Classification Search .......... 507/273, 507/266
See application file for complete search history.

(56) References Cited

U.S. PATENT DOCUMENTS

| | | | |
|---|---|---|---|
| 5,373,901 A | 12/1994 | Norman et al. | |
| 5,877,127 A | 3/1999 | Card et al. | |
| 6,350,527 B1 * | 2/2002 | Hubbell et al. | 428/473 |
| 6,444,316 B1 | 9/2002 | Reddy et al. | |
| 6,488,091 B1 | 12/2002 | Weaver et al. | |
| 6,527,051 B1 | 3/2003 | Reddy et al. | |
| 6,554,071 B1 | 4/2003 | Reddy et al. | |
| 6,652,902 B2 * | 11/2003 | Hubbell et al. | 427/2.11 |
| 2002/0061288 A1 * | 5/2002 | Hubbell et al. | 424/78.17 |
| 2002/0169085 A1 * | 11/2002 | Miller et al. | 507/200 |

OTHER PUBLICATIONS

Gunter Wulff, 'Selective Binding to Polymers via Covalent Bonds', Pure & Appl. Chem, vol. 54, No. 11, pp. 2093-2102, 1982.*
S. L. Wiskur, et al., *Org. Lett.*, 3(9); 1311-14 (2001).

* cited by examiner

*Primary Examiner*—Randy Gulakowski
*Assistant Examiner*—John J Figueroa
(74) *Attorney, Agent, or Firm*—Robert A. Kent; Baker Botts LLP

(57) ABSTRACT

The present invention provides a method of forming a viscosified treatment fluid comprising: providing a treatment fluid that comprises water and a gelling agent; contacting the treatment fluid with a boronic acid crosslinking agent so as to form a crosslinked gelling agent, wherein the boronic acid crosslinking agent comprises a compound having the formula:

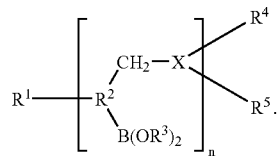

The present invention also provides methods of crosslinking gelling agent molecules, methods of treating a subterranean formation, methods of reusing viscosified treatment fluids, methods of fracturing subterranean formations, and methods of placing a gravel pack in subterranean formations. The present invention also provides boronic acid crosslinking agents and viscosified treatment fluids that comprise crosslinked gelling agents, the crosslinked gelling agent being formed from a reaction comprising a gelling agent and a boronic acid crosslinking agent.

44 Claims, 2 Drawing Sheets

METHODS AND COMPOSITIONS FOR CROSSLINKING POLYMERS WITH BORONIC ACIDS

BACKGROUND

The present invention relates to methods and compositions for increasing the viscosity of a fluid. More particularly, the present invention relates to boronic acid crosslinking agents, viscosified treatment fluids, and methods of using these compositions in applications wherein viscosified fluids may be used.

Many industrial applications require viscosified fluids or "viscosified treatment fluids." For instance, the upstream energy industry uses viscosified treatment fluids in a variety of production and stimulation operations. For example, such fluids may be used as drilling fluids, fracturing fluids, and gravel packing fluids.

Viscosified treatment fluids that are used in subterranean operations generally are aqueous-based fluids that comprise gelling agents. These gelling agents may comprise biopolymers or synthetic polymers. Common gelling agents include, e.g., galactomannan gums, cellulosic polymers, and polysaccharides.

Most viscosified treatment fluids include crosslinked gelling agent molecules to increase their viscosity. The crosslinking between gelling agent molecules occurs through the action of a crosslinking agent. These crosslinking agents may comprise a metal, transition metal, or metalloid, collectively referred to herein as "metal(s)." Examples include boron, aluminum, antimony, zirconium, magnesium, or titanium. Generally, the metal of a crosslinking agent interacts with at least two gelling agent molecules to form a crosslink between them, thereby forming a crosslinked gelling agent.

Crosslinking agents often comprise boron because it is compatible with a number of gelling agents used in viscosified treatment fluids. These boron-containing crosslinking agents, however, generally are limited to viscosified treatment fluids used in environments that have a pH of about 8 and above and a temperature below about 300° F. This pH requirement may preclude using salt water in the viscosified treatment fluid. Similarly, viscosified treatment fluids comprising gelling agents that are crosslinked with boron-containing crosslinking agents may suffer from thermal instability at certain elevated temperatures, like those frequently encountered in some subterranean operations. In addition, boron-containing crosslinking agents often react with additives commonly used with treatment fluids, e.g., glycols (such as ethylene or propylene glycol) or alcohols (such as methanol). To overcome this propensity, boron crosslinking agents typically are added in excess to treatment fluids, which may increase the environmental footprint and the costs associated with the treatment fluid.

SUMMARY

The present invention relates to methods and compositions for increasing the viscosity of a fluid. More particularly, the present invention relates to boronic acid crosslinking agents, viscosified treatment fluids, and methods of using these compositions in applications wherein viscosified fluids may be used.

In one embodiment, the present invention provides a method of forming a viscosified treatment fluid comprising: providing a treatment fluid that comprises water and a gelling agent; contacting the treatment fluid with a boronic acid crosslinking agent so as to form a crosslinked gelling agent, wherein the boronic acid crosslinking agent comprises a compound having the formula:

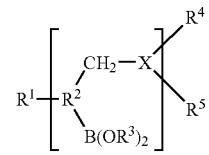

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH+R'B(OR)_2$ ? $R'OH+B(OR)_3$; R, R', and $R^3$ can be hydrogens, alkyl groups, aryl groups, or combinations thereof, wherein R, R', and $R^3$ can be the same or different; $-B(OR^3)_2$ can be a boronic acid group; and n is a positive integer greater than or equal to one.

In another embodiment, the present invention provides a method of forming a viscosified treatment fluid comprising: providing a treatment fluid that comprises water and a gelling agent; contacting the treatment fluid with a boronic acid crosslinking agent so as to form a crosslinked gelling agent, wherein the boronic acid crosslinking agent comprises a compound having the formula:

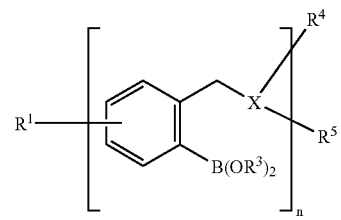

wherein X can be a Lewis base; $R^1$, $R^4$, and $R^5$ can be heteroatoms, organic fragments, or combinations thereof, wherein $R^1$, $R^4$, and $R^5$ can be the same or different; $-B(OR_3)_2$ can be a boronic acid group; $R^3$ can be hydrogen, an alkyl group, an aryl group, or a combination thereof; and n is a positive integer greater than or equal to one.

In another embodiment, the present invention provides a method of forming a viscosified treatment fluid comprising: providing a treatment fluid that comprises water and a gelling agent; contacting the treatment fluid with a boronic acid crosslinking agent so as to form a crosslinked gelling agent, wherein the boronic acid crosslinking agent comprises a compound having the formula:

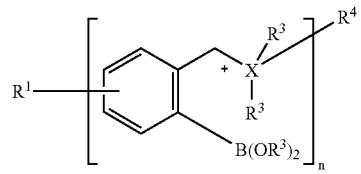

wherein X can be a Lewis base; $R^1$ and $R^4$ can be heteroatoms, organic fragments, or combinations thereof, wherein $R^1$ and $R^4$ can be the same or different; $-B(OR^3)_2$ can be a boronic acid group; $R^3$ can be hydrogen, an alkyl group, an aryl group, or a combination thereof; and n is a positive integer greater than or equal to one.

In another embodiment, the present invention provides a method of forming a viscosified treatment fluid comprising: providing a treatment fluid that comprises

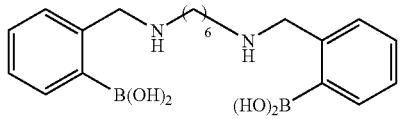

water and a gelling agent; and contacting the treatment fluid with a boronic acid crosslinking agent so as to form a crosslinked gelling agent, wherein the boronic acid crosslinking agent comprises a compound having the formula:

In another embodiment, the present invention provides a method of crosslinking gelling agent molecules comprising: contacting at least two gelling agent molecules with a boronic acid crosslinking agent, wherein the boronic acid crosslinking agent comprises a compound having the formula:

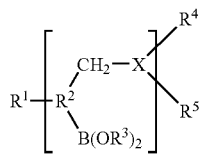

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH+R'B(OR)_2$ ? $R'OH+B(OR)_3$; R, R', and $R^3$ can be hydrogens, alkyl groups, aryl groups, or combinations thereof, wherein R, R', and $R^3$ can be the same or different; $—B(OR^3)_2$ can be a boronic acid group; and n is a positive integer greater than or equal to one.

In another embodiment, the present invention provides a method of crosslinking gelling agent molecules comprising: contacting at least two gelling agent molecules with a boronic acid crosslinking agent, wherein the boronic acid crosslinking agent comprises a compound having the formula:

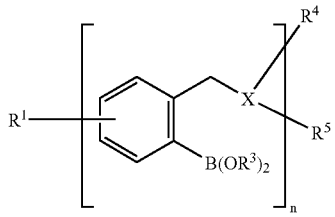

wherein X can be a Lewis base; $R^1$, $R^4$, and $R^5$ can be heteroatoms, organic fragments, or combinations thereof, wherein $R^1$, $R^4$, and $R^5$ can be the same or different; $—B(OR^3)_2$ can be a boronic acid group; $R^3$ can be hydrogen, an alkyl group, an aryl group, or a combination thereof; and n is a positive integer greater than or equal to one.

In another embodiment, the present invention provides a method of crosslinking gelling agent molecules comprising:

contacting at least two gelling agent molecules with a boronic acid crosslinking agent, wherein the boronic acid crosslinking agent comprises a compound having the formula:

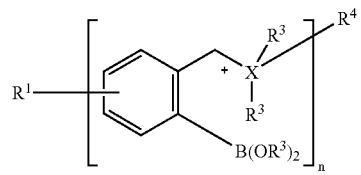

wherein X can be a Lewis base; $R^1$ and $R^4$ can be heteroatoms, organic fragments, or combinations thereof, wherein $R^1$ and $R^4$ can be the same or different; $—B(OR^3)_2$ can be a boronic acid group; $R^3$ can be hydrogen, an alkyl group, an aryl group, or a combination thereof; and n is a positive integer greater than or equal to one.

In another embodiment, the present invention provides a method of crosslinking gelling agent molecules comprising: contacting at least two gelling agent molecules with a boronic acid crosslinking agent, wherein the boronic acid crosslinking agent comprises a compound having the formula:

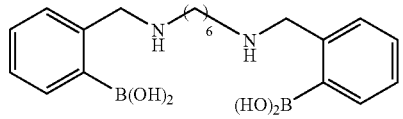

In another embodiment, the present invention provides a method of treating a subterranean formation comprising: providing a viscosified treatment fluid that comprises water and a crosslinked gelling, the crosslinked gelling agent being formed by a reaction comprising a gelling agent and a boronic acid crosslinking agent comprising a compound having the formula:

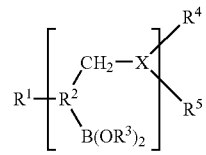

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH+R'B(OR)_2$ ? $R'OH+B(OR)_3$; R, R', and $R^3$ can be hydrogens, alkyl groups, aryl groups, or combinations thereof, wherein R, R', and $R^3$ can be the same or different; $—B(OR^3)_2$ can be a boronic acid group; n is a positive integer greater than or equal to one; and treating the subterranean formation.

In another embodiment, the present invention provides a method of treating a subterranean formation comprising: providing a viscosified treatment fluid that comprises water and a crosslinked gelling agent, the crosslinked gelling agent being formed by a reaction comprising a gelling agent and a boronic acid crosslinking agent comprising a compound having the formula:

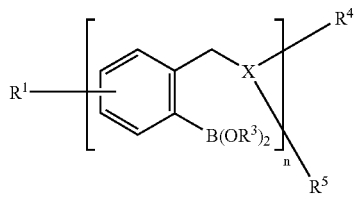

wherein X can be a Lewis base; $R^1$, $R^4$, and $R^5$ can be heteroatoms, organic fragments, or combinations thereof, wherein $R^1$, $R^4$, and $R^5$ can be the same or different; $-B(OR^3)_2$ can be a boronic acid group; $R^3$ can be hydrogen, an alkyl group, an aryl group, or a combination thereof; and n is a positive integer greater than or equal to one.

In another embodiment, the present invention provides a method of treating a subterranean formation comprising: providing a viscosified treatment fluid that comprises water and a crosslinked gelling agent, the crosslinked gelling agent being formed by a reaction comprising a gelling agent and a boronic acid crosslinking agent comprising a compound having the formula:

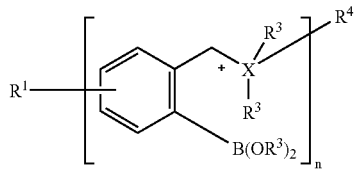

wherein X can be a Lewis base; $R^1$ and $R^4$ can be heteroatoms, organic fragments, or combinations thereof, wherein $R^1$ and $R^4$ can be the same or different; $-B(OR^3)_2$ can be a boronic acid group; $R^3$ can be hydrogen, an alkyl group, an aryl group, or a combination thereof; and n is a positive integer greater than or equal to one.

In another embodiment, the present invention provides a method of treating a subterranean formation comprising: providing a viscosified treatment fluid that comprises water and a crosslinked gelling agent, the crosslinked gelling agent being formed by a reaction comprising a gelling agent and a boronic acid crosslinking agent comprising a compound having the formula:

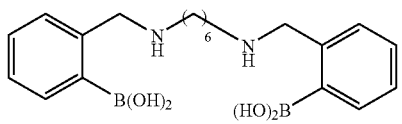

In another embodiment, the present invention provides a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

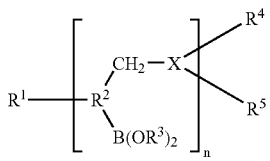

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH+R'B(OR)_2$ ? $R'OH+B(OR)_3$; R, R', and $R^3$ can be hydrogens, alkyl groups, aryl groups, or combinations thereof, wherein R, R', and $R^3$ can be the same or different; $-B(OR^3)_2$ can be a boronic acid group; n is a positive integer greater than or equal to one; adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

In another embodiment, the present invention provides a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

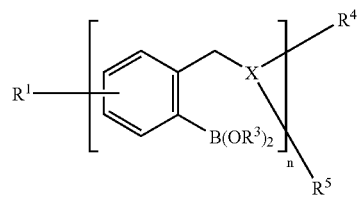

wherein X can be a Lewis base; $R^1$, $R^4$, and $R^5$ can be heteroatoms, organic fragments, or combinations thereof, wherein $R^1$, $R^4$, and $R^5$ can be the same or different; $-B(OR^3)_2$ can be a boronic acid group; $R^3$ can be hydrogen, an alkyl group, an aryl group, or a combination thereof; n is a positive integer greater than or equal to one; adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

In another embodiment, the present invention provides a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

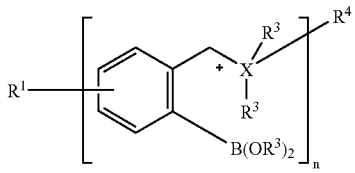

wherein X can be a Lewis base; $R^1$ and $R^4$ can be heteroatoms, organic fragments, or combinations thereof, wherein $R^1$ and $R^4$ can be the same or different; —$B(OR^3)_2$ can be a boronic acid group; $R^3$ can be hydrogen, an alkyl group, an aryl group, or a combination thereof; n is a positive integer greater than or equal to one; adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

In another embodiment, the present invention provides a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

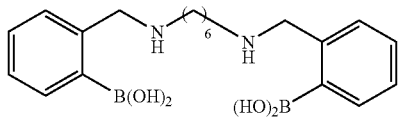

adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

In another embodiment, the present invention provides a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

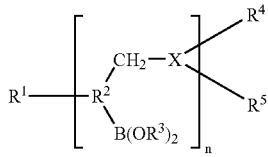

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH + R'B(OR)_2 \rightleftharpoons R'OH + B(OR)_3$; R, R', and $R^3$ can be hydrogens, alkyl groups, aryl groups, or combinations thereof, wherein R, R', and $R^3$ can be the same or different; —$B(OR^3)_2$ can be a boronic acid group; n is a positive integer greater than or equal to one; and placing the viscosified treatment fluid in a subterranean formation at a pressure sufficient to create or enhance one or more fractures therein.

In another embodiment, the present invention provides a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

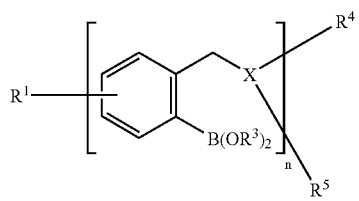

wherein X can be a Lewis base; $R^1$, $R^4$, and $R^5$ can be heteroatoms, organic fragments, or combinations thereof, wherein $R^1$, $R^4$, and $R^5$ can be the same or different; —$B(OR^3)_2$ can be a boronic acid group; $R^3$ can be hydrogen, an alkyl group, an aryl group, or a combination thereof; n is a positive integer greater than or equal to one; and placing the viscosified treatment fluid in a subterranean formation at a pressure sufficient to create or enhance one or more fractures therein.

In another embodiment, the present invention provides a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

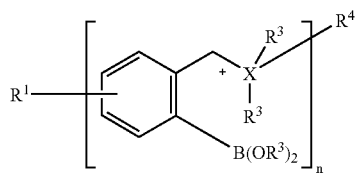

wherein X can be a Lewis base; $R^1$ and $R^4$ can be heteroatoms, organic fragments, or combinations thereof, wherein $R^1$ and $R^4$ can be the same or different; —$B(OR^3)_2$ can be a boronic acid group; $R^3$ can be hydrogen, an alkyl group, an aryl group, or a combination thereof; n is a positive integer greater than or equal to one; and placing the viscosified treatment fluid in a subterranean formation at a pressure sufficient to create or enhance one or more fractures therein.

In another embodiment, the present invention provides a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

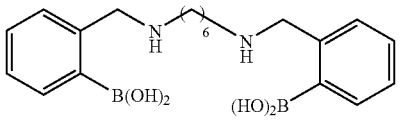

; and placing the viscosified treatment fluid in a subterranean formation at a pressure sufficient to create or enhance one or more fractures therein.

In another embodiment, the present invention provides a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

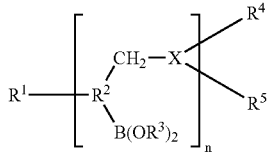

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: ROH+R'B(OR)$_2$ ? R'OH+B(OR)$_3$; R, R', and $R^3$ can be hydrogens, alkyl groups, aryl groups, or combinations thereof, wherein R, R', and $R^3$ can be the same or different; —B(OR$^3$)$_2$ can be a boronic acid group; n is a positive integer greater than or equal to one; and placing the viscosified treatment fluid in or near a portion of the subterranean formation so as to create a gravel pack.

In another embodiment, the present invention provides a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

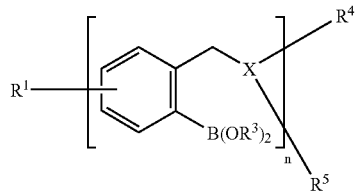

wherein X can be a Lewis base; $R^1$, $R^4$, and $R^5$ can be heteroatoms, organic fragments, or combinations thereof, wherein $R^1$, $R^4$, and $R^5$ can be the same or different; —B(OR$^3$)$_2$ can be a boronic acid group; $R^3$ can be hydrogen, an alkyl group, an aryl group, or a combination thereof; n is a positive integer greater than or equal to one; and placing the viscosified treatment fluid in or near a portion of the subterranean formation so as to create a gravel pack.

In another embodiment, the present invention provides a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

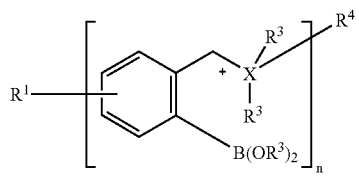

wherein X can be a Lewis base; $R^1$ and $R^4$ can be heteroatoms, organic fragments, or combinations thereof, wherein $R^1$ and $R^4$ can be the same or different; —B(OR$^3$)$_2$ can be a boronic acid group; $R^3$ can be hydrogen, an alkyl group, an aryl group, or a combination thereof; n is a positive integer greater than or equal to one; and placing the viscosified treatment fluid in or near a portion of the subterranean formation so as to create a gravel pack.

In another embodiment, the present invention provides a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

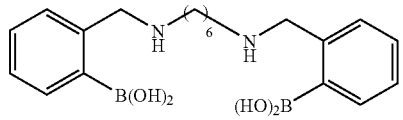

; and placing the viscosified treatment fluid in or near a portion of the subterranean formation so as to create a gravel pack.

In another embodiment, the present invention provides a boronic acid crosslinking agent comprising a compound having the formula:

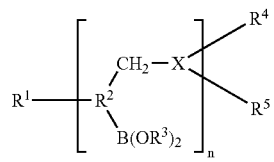

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: ROH+R'B(OR)$_2$ ? R'OH+B(OR)$_3$; R, R', and $R^3$ can be hydrogens, alkyl groups, aryl groups, or combinations thereof, wherein R, R', and $R^3$ can be the same or different; —B(OR$^3$)$_2$ can be a boronic acid group; and n is a positive integer greater than or equal to one.

In another embodiment, the present invention provides a boronic acid crosslinking agent comprising a compound having the formula:

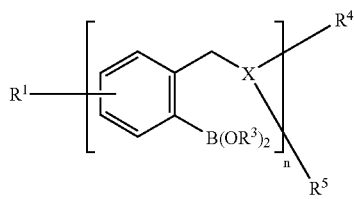

wherein X can be a Lewis base; $R^1$, $R^4$, and $R^5$ can be heteroatoms, organic fragments, or combinations thereof, wherein $R^1$, $R^4$, and $R^5$ can be the same or different; —$B(OR^3)_2$ can be a boronic acid group; $R^3$ can be hydrogen, an alkyl group, an aryl group, or a combination thereof; and n is a positive integer greater than or equal to one.

In another embodiment, the present invention provides a boronic acid crosslinking agent comprising a compound having the formula:

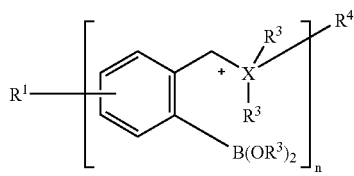

wherein X can be a Lewis base; $R^1$ and $R^4$ can be heteroatoms, organic fragments, or combinations thereof, wherein $R^1$ and $R^4$ can be the same or different; —$B(OR^3)_2$ can be a boronic acid group; $R^3$ can be hydrogen, an alkyl group, an aryl group, or a combination thereof; and n is a positive integer greater than or equal to one.

In another embodiment, the present invention provides a boronic acid crosslinking agent comprising a compound having the formula:

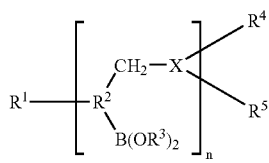

In another embodiment, the present invention provides a viscosified treatment fluid comprising a crosslinked gelling agent, the crosslinked gelling agent being formed from a reaction comprising a gelling agent and a boronic acid crosslinking agent comprising a compound having the formula:

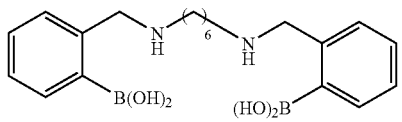

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: ROH+R'B(OR)$_2$ ? R'OH+B(OR)$_3$; R, R', and $R^3$ can be hydrogens, alkyl groups, aryl groups, or combinations thereof, wherein R, R', and $R^3$ can be the same or different; —$B(OR^3)_2$ can be a boronic acid group; and n is a positive integer greater than or equal to one.

In another embodiment, the present invention provides a viscosified treatment fluid comprising a crosslinked gelling agent, the crosslinked gelling agent being formed from a reaction comprising a gelling agent and a boronic acid crosslinking agent comprising a compound having the formula:

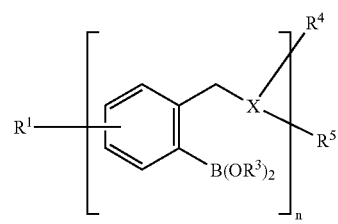

wherein X can be a Lewis base; $R^1$, $R^4$, and $R^5$ can be heteroatoms, organic fragments, or combinations thereof, wherein $R^1$, $R^4$, and $R^5$ can be the same or different; —$B(OR^3)_2$ can be a boronic acid group; $R^3$ can be hydrogen, an alkyl group, an aryl group, or a combination thereof; and n is a positive integer greater than or equal to one.

In another embodiment, the present invention provides a viscosified treatment fluid comprising a crosslinked gelling agent, the crosslinked gelling agent being formed from a reaction comprising a gelling agent and a boronic acid crosslinking agent comprising a compound having the formula:

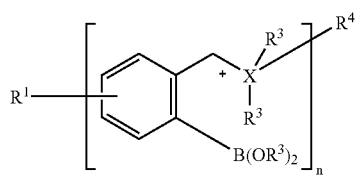

wherein X can be a Lewis base; $R^1$ and $R^4$ can be heteroatoms, organic fragments, or combinations thereof, wherein $R^1$ and $R^4$ can be the same or different; —$B(OR^3)_2$ can be a boronic acid group; $R^3$ can be hydrogen, an alkyl group, an aryl group, or a combination thereof; and n is a positive integer greater than or equal to one.

In another embodiment, the present invention provides a viscosified treatment fluid comprising a crosslinked gelling agent, the crosslinked gelling agent being formed from a reaction comprising a gelling agent and a boronic acid crosslinking agent comprising a compound having the formula:

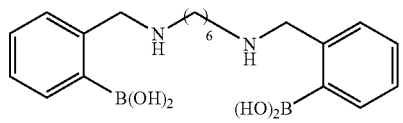

The features and advantages of the present invention will be readily apparent to those skilled in the art upon a reading of the description of the embodiments that follows.

BRIEF DESCRIPTION OF THE FIGURES

A more complete understanding of the present disclosure and advantages thereof may be acquired by referring to the following description taken in conjunction with the accompanying figures.

Figure 1:
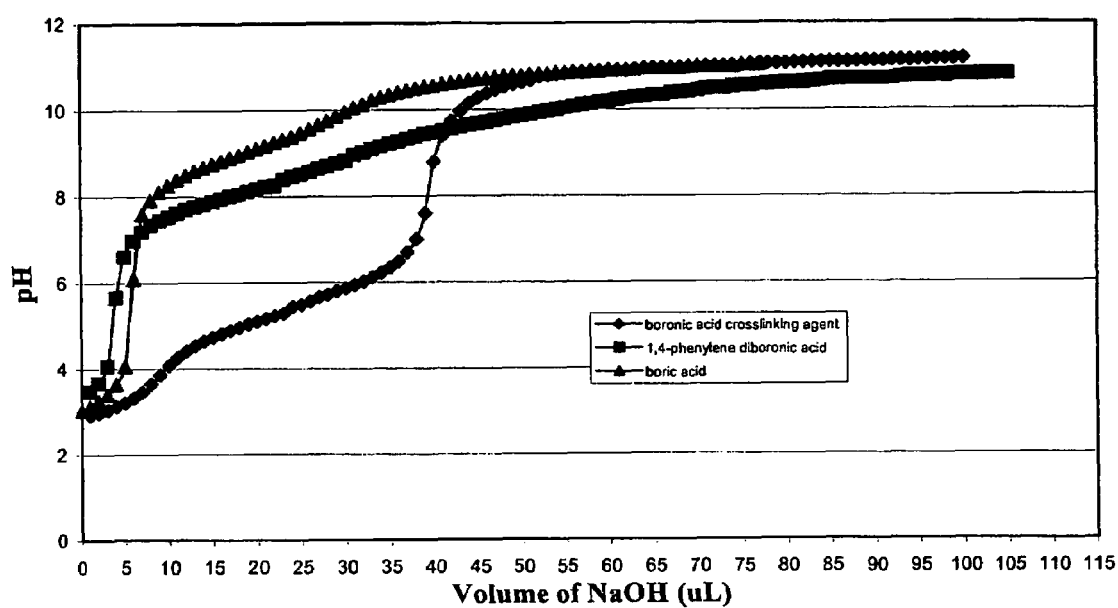
FIG. 1 illustrates a graph of a pH titration.

While the present invention is susceptible to various modifications and alternative forms, specific exemplary embodiments thereof have been shown in the figures and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates to methods and compositions for increasing the viscosity of a fluid. More particularly, the present invention relates to boronic acid crosslinking agents, viscosified treatment fluids, and methods of using these compositions in applications wherein viscosified fluids may be used. The methods and compositions of the present invention are useful in a variety of applications in which it is desirable to increase the viscosity of a fluid. Examples include, but are not limited to, treatment fluids used in subterranean applications, such as drilling fluids, fracturing fluids, and gravel packing fluids. Although many of the embodiments of the present invention will be discussed in the context of subterranean applications, such discussion is only intended to illustrate some applications of the boronic acid crosslinking agents of the present invention. The boronic acid crosslinking agents of the present invention are suitable for many uses in which the viscosity of a fluid may be increased. Any limitation of the compositions and methods of the present invention to subterranean uses is an improper narrowing of their applications.

The present invention provides boronic acid crosslinking agents capable of crosslinking two or more molecules, e.g., two or more gelling agent molecules. The term "crosslink(s)" or "crosslinking" refers to a comparatively short connecting unit (as in a chemical bond or chemically bonded group), in relation to a monomer, oligomer, or polymer, between neighboring chains of atoms in a complex chemical molecule, e.g., a polymer. The boronic acid crosslinking agents of the present invention comprise compounds represented by Formula I:

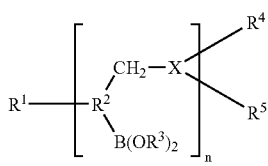

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1:

$$ROH + R'B(OR)_2 \rightleftharpoons R'OH + B(OR)_3;$$

R, R', and $R^3$ can be hydrogens, alkyl groups, aryl groups, or combinations thereof, wherein R, R', and $R^3$ can be the same or different; —$B(OR^3)_2$ can be a boronic acid group; and n is a positive integer greater than or equal to one.

In certain embodiments of the boronic acid crosslinking agents of the present invention, n of Formula I may have a practical upper limit. Such an upper limit may be defined by the practicality of combining or adding n+1 molecules based on, for example, the properties of the resultant compound and the cost of producing the resultant compound. The practical upper limit of n will be apparent, with the benefit of this disclosure, to a person having ordinary skill in the art based on, e.g., the particular boronic acid crosslinking agent used, material costs, and fluid properties desired. In certain exemplary embodiments, n may be in the range of about 1 to about 100.

In certain embodiments, suitable heteroatoms for $R^1$, $R^4$, and $R^5$ of Formula I include, but are not limited to, nitrogen, oxygen, sulfur, and phosphorous. Suitable organic fragments of $R^1$, $R^4$, and $R^5$ include, but are not limited to, alcohols, alkyl groups, aryl groups, or combinations thereof. In certain exemplary embodiments, $R^1$, $R^4$, and $R^5$ may comprise the same group. For example, in one embodiment $R^1$, $R^4$, and $R^5$ all may comprise an aryl group. In other exemplary embodiments, $R^1$, $R^4$, and $R^5$ may comprise different groups. For example, $R^1$ may comprise an aryl group, $R^4$ may be hydrogen, and $R^5$ may comprise a heteroatom. In addition, any $R^1$, $R^4$, and $R^5$ independently may be substituted. For example, when $R^1$ is an aryl group, the aryl group may be substituted.

In certain embodiments of the present invention, $R^2$ of Formula I may comprise a group capable of stabilizing a boronic acid group. The term "boronic acid group" refers to the group in Formula I represented by: —$B(OR^3)_2$. In certain exemplary embodiments, $R^2$ of Formula I may comprise an aryl group. The aryl group may be a bi-aryl group (e.g., napthalene); tri-aryl group (e.g., anthracene); or combinations thereof. The aryl group also may be substituted (e.g., carboxy, chloro, fluoro, methoxy, methoxythio, naphthyl, thiophene, tolyl, furyl); unsubstituted (e.g., benzyl, phenyl); or combinations thereof. Additionally, $R^2$ may be tailored to achieve boronic acid crosslinking agents with certain desired properties. For example, when water solubility is desired, $R^2$ may comprise, e.g., a polyether represented by Formula II:

wherein q is a positive integer greater than or equal to one (e.g., in some embodiments, q may be in the range of from about 1 to about 30). In other embodiments, $R^2$ may comprise a "spacer group" that increases the size of the boronic acid crosslinking agent. Spacer groups may provide a means to increase the thermal stability of the boronic acid crosslinking agents of the present invention. A nonlimiting theory to explain the increased thermal stability is that the spacer group increases the molecular weight of the boronic acid crosslinking agent, and larger boronic acid crosslinking agents generally are more stable at higher temperatures. An example of a suitable spacer group may be represented by Formula III:

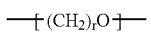

wherein r is a positive integer greater than or equal to one (e.g., in some embodiments, r may be in the range of from about 1 to about 30). In certain exemplary embodiments, Formula III may be substituted. For example, any methylene in Formula III may be substituted by any epoxide ring, alkyl halides, carbonyl groups, amido groups, oxygen, sulfur, or combinations thereof.

Generally, the X group of Formula I should be capable of interacting with the boronic acid group of Formula I to lower the complexation pKa of boron, e.g., through the formation of an intramolecular Lewis acid-Lewis base complex. In certain embodiments of the boronic acid crosslinking agents of the present invention, X may be capable of having a lone pair of electrons such as when X is a heteroatom. Suitable heteroatoms may include, but are not limited to, nitrogen, oxygen, sulfur, and phosphorous. And X may be a primary, a secondary, or a tertiary group. In certain exemplary embodiments in which the molecules to be crosslinked have a hydroxyl group, X may comprise nitrogen, and the crosslink that forms with the molecule may comprise a boronate ester.

In certain embodiments of the present invention, a boronic acid crosslinking agent of Formula I may comprise a compound represented by Formula IV:

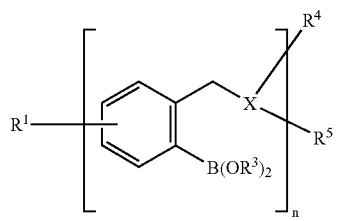

wherein X can be a Lewis base; $R^1$, $R^4$, and $R^5$ can be heteroatoms, organic fragments, or combinations thereof, wherein $R^1$, $R^4$, and $R^5$ can be the same or different; —$B(OR^3)_2$ can be a boronic acid group; $R^3$ can be hydrogen, an alkyl group, an aryl group, or a combination thereof; and n is a positive integer greater than or equal to one (e.g., in the range of from about 1 to about 6). In other embodiments, a boronic acid crosslinking agent of Formula I may comprise a compound represented by Formula V:

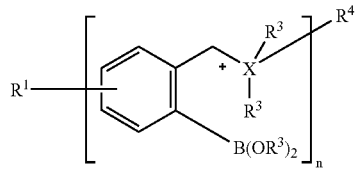

wherein X can be a Lewis base; $R^1$ and $R^4$ can be heteroatoms, organic fragments, or combinations thereof, wherein $R^1$ and $R^4$ can be the same or different; —$B(OR^3)_2$ can be a boronic acid group; $R^3$ can be hydrogen, an alkyl group, an aryl group, or a combination thereof; and n is a positive integer greater than or equal to one (e.g., in the range of from about 1 to about 6). In certain exemplary embodiments of the present invention, a boronic acid crosslinking agent of Formula I may comprise a compound represented by Formula VI:

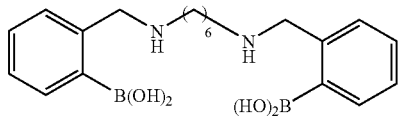

In certain exemplary embodiments, the boronic acid crosslinking agents of the present invention may comprise an equilibrium species. For example, the boronic acid crosslinking agents may become protonated or deprotonated depending on pH. Likewise, intramolecular interactions between atoms in the boronic acid crosslinking agents of the present invention (e.g., a Lewis acid-Lewis base intramolecular complex between boron and X in Formula I) and the geometry of boron (e.g., tetrahedral or trigonal planar) may depend on pH and/or solvent (e.g., an alcohol-based solvent like methanol). Thus, the exact chemical composition and geometry of the boronic acid crosslinking agents of the present invention may depend on a particular equilibrium known to one of ordinary skill in the art, e.g., the equilibrium based on pH.

One of ordinary skill in the art, with the benefit of this disclosure, may synthesize the boronic acid crosslinking agents of the present invention using known materials and the relevant methods of preparative organic chemistry. For example, the boronic acid crosslinking agents of the present invention may be synthesized using reductive amination (see generally S. L. Wiskur, et al., *Org. Lett.*, 3(9):1311-14 (2001)).

The boronic acid crosslinking agents of the present invention may be provided or used in any suitable form. For instance, the boronic acid crosslinking agents may be a liquid, a gel, an emulsion, or a solid. The form of the boronic acid crosslinking agent may depend on the specific choice of the boronic acid crosslinking agent of Formula I. For example, $R^1$ of Formula I, $R^2$ of Formula I, or both may comprise molecules that result in a boronic acid crosslinking agent that is at least partially insoluble in water. Thus, this boronic acid crosslinking agent would not be in an aqueous form. In other embodiments, a boronic acid crosslinking agent may be dissolved, suspended, or emulsified in a liquid. In other embodiments, a boronic acid crosslinking agent may be used in a form that allows for a delayed release of the boronic acid crosslinking agent. A delayed release may be desirable when a subterranean operation involves high temperature conditions, and release of the boronic acid crosslinking agent is desired after these high temperature conditions occur. For example, in wells with temperatures that require a second crosslinking agent, the second crosslinking agent may be tailored to become available for crosslinking when first crosslinker fails, e.g., at temperatures in which a conventional boron based crosslinker fails. A delayed release also may be desirable in a deep well or in a well requiring a long pump time. In certain embodiments, the boronic acid crosslinking agents of the present invention may be encapsulated or enclosed within an outer coating that is capable of degrading at a desired time. Exemplary encapsulation methodologies are described in U.S. Pat. Nos. 5,373,901; 6,444,316; 6,527,051; and 6,554,071, the relevant disclosures of which are incorporated herein by reference. A person having ordinary skill in the art, with the benefit of this disclosure, will recognize the appropriate encapsulation or coating technique to use with the boronic acid crosslinking agents of the present invention.

In certain embodiments in which the boronic acid crosslinking agents of the present invention are encapsulated, the boronic acid crosslinking agents may comprise a coating or containment means, e.g., to delay the release of a boronic acid crosslinking agent. In general, suitable coating or containment means are degradable materials in which the products of the degradation do not adversely affect the boronic acid crosslinking agents of the present invention. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. Examples of degradable materials that may be used as a coating or containment means in conjunction with the boronic acid crosslinking agents of the present invention include, but are not limited to, polysaccharides, such as dextran or cellulose; chitins; chitosans; proteins; aliphatic polyesters; poly(lactides); poly(glycolides); poly(e-caprolactones); poly(hydroxybutyrates); poly(anhydrides); aliphatic polycarbonates; ortho esters; poly(orthoesters); poly(amino acids); poly(ethylene oxides); and poly(phosphazenes). Other suitable degradable polymers include heat-sealable materials, other thermoplastic materials, or materials that may be dissolved with an appropriate solvent (e.g., hydroxypropylmethylcellulose, pectin, polyethylene oxide, polyvinyl alcohol, alginate, polycaprolactone, gelatinised starch-based materials, and the like). In certain exemplary embodiments, blends of these materials may be used.

In certain exemplary embodiments in which an operator wants to delay crosslinking, the boronic acid crosslinking agents of the present invention may comprise hydrolyzable groups, e.g., a boronate ester. In general, such boronic acid crosslinking agents become capable of crosslinking as the hydrolyzable groups are hydrolyzed. In certain exemplary embodiments, a hydrolyzable group may be provided on the boronic acid crosslinking agents of Formula I when $R^3$ comprises pinacol. One of ordinary skill in the art, with the benefit of this disclosure, will recognize the appropriate time, temperature, and pH necessary to hydrolyze the hydrolyzable groups of the boronic acid crosslinking agents of the present invention.

The boronic acid crosslinking agents of the present invention may be used to form a crosslinked gelling agent. Under appropriate conditions (e.g., pH and temperature), the boronic acid crosslinking agents of the present invention may allow one or more crosslinks to form between at least two gelling agent molecules thereby forming a crosslinked gelling agent. The boronic acid crosslinking agents of the present invention, in certain embodiments, may allow for the use of viscosified treatment fluids in conditions unsuitable for traditional crosslinking agents, e.g., elevated temperatures and some pHs. In addition, the boronic acid crosslinking agents of the present invention, in certain embodiments, may allow for recovery and reuse of viscosified treatment fluids or their components. Such reuse includes the reuse of the viscosified treatment fluid in its entirety or any individual component or combination of components.

In general, the viscosified treatment fluids of the present invention comprise water and a crosslinked gelling agent, the crosslinked gelling agent being formed from a reaction comprising a gelling agent and a boronic acid crosslinking agent of the present invention. In certain embodiments, the viscosified treatment fluids of the present invention may be formed by including a boronic acid crosslinking agent of the present invention in a treatment fluid that comprises water and a gelling agent, and allowing a crosslinked gelling agent to form.

The water of the viscosified treatment fluids of the present invention may comprise fresh water, saltwater (e.g., water containing one or more salts dissolved therein), brine (e.g., saturated salt water), or seawater. The water can be from any source if it does not contain an excess of compounds that adversely affect other components in the viscosified treatment fluid.

A variety of gelling agents can be used to form the crosslinked gelling agents of the viscosified treatment fluids of the present invention. Suitable gelling agents typically comprise biopolymers, synthetic polymers, or both. Suitable gelling agents often are hydratable polymers that have one or more functional groups. These functional groups include, but are not limited to, hydroxyl groups, carboxyl groups, carboxylic acids, derivatives of carboxylic acids, sulfate groups, sulfonate groups, phosphate groups, phosphonate groups, amino groups, and amide groups. In certain exemplary embodiments, the gelling agents may be biopolymers comprising polysaccharides, and derivatives thereof, that have one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent may be depolymerized. The term "depolymerized," as used herein, generally refers to a decrease in the molecular weight of the gelling agent molecule. Depolymerized gelling agent molecules are described in U.S. Pat. No. 6,488,091, the relevant disclosure of which is incorporated herein by reference. In certain embodiments, the gelling agent is present in the treatment fluids of the present invention in an amount in the range of from about 0.1% to about 10% by weight of the water therein. In certain exemplary embodiments, the gelling agent is present in the treatment fluids of the present invention in an amount in the range of from about 1% to about 4% by weight of the water therein.

The boronic acid crosslinking agents of the present invention may be used to crosslink gelling agent molecules to form crosslinked gelling agents. The boronic acid crosslinking agents of the present invention generally are used to form the viscosified treatment fluids of the present invention in amounts sufficient to provide the desired degree of crosslinking between gelling agent molecules. In certain exemplary embodiments, the boronic acid crosslinking agents are used in an amount in the range of from about 0.003% to about 1% by weight of the water therein.

In some applications, after a viscosified treatment fluid has performed its desired function, its viscosity may be reduced. For example, in a subterranean application, once the viscosified treatment fluid's viscosity is reduced, it may be flowed back to the surface, and the well may be returned to production. Reducing the viscosity of a viscosified treatment fluid may occur by adjusting the pH of the treatment fluid so that crosslinks between gelling agent molecules become unstable or "delink." The terms "delink" or "delinking" refer to the reversible removal of crosslinks between at least two molecules that are crosslinked (e.g., crosslinked gelling agent molecules). Delinking also may occur, independent of pH, through the addition of a compound capable of removing the metal associated with the crosslink. Such delinking is described in U.S. patent application Ser. No. 10/664,206 titled "Environmentally Benign Viscous Well Treating Fluids and Methods" filed Sep. 9, 2003, the relevant disclosures of which is incorporated herein by reference. Although the crosslinked gelling agent molecules crosslinked with the boronic acid crosslinking agents of the present invention may be capable of delinking based on pH, any breaker may be used with the viscosified treatment fluids of the present invention. The term "breaker" refers to an agent that is capable of reducing the viscosity of a treatment fluid. For example, any breaker that is an acid, oxidizer, or enzyme known in the art may be used with the treatment fluids of the present invention.

The viscosified treatment fluids of the present invention also may comprise pH-adjusting agents. The pH-adjusting agents may be included in the viscosified treatment fluid to adjust the pH of the viscosified treatment fluid, inter alia, to facilitate the formation or delinking of crosslinks between gelling agent molecules. Generally, boronic acid crosslinking agents are not capable of forming crosslinks between gelling agent molecules in acidic environments about at or below about pH 7. Therefore crosslinking or delinking may occur by adjusting the pH of the viscosified treatment fluid once it is placed in a desired location, e.g., in a subterranean well bore. In certain exemplary embodiments in which the pH is to be increased (e.g., to facilitate crosslinking), suitable pH-adjusting agents comprise a base. Examples of suitable bases include, but are not limited to, sodium hydroxide, potassium hydroxide, lithium hydroxide, or a combination thereof. In other exemplary embodiments in which the pH is to be decreased (e.g., to facilitate delinking crosslinks), suitable pH-adjusting agents include, but are not limited to, fumaric acid, formic acid, acetic acid, acetic anhydride, hydrochloric acid, hydrofluoric acid, hydroxyfluoroboric acid, polyaspartic acid, polysuccinimide, or a combination thereof. The appropriate pH-adjusting agent and amount thereof used may depend on the formation characteristics and conditions, on the breaking or crosslinking time desired, on the nature of the X group of Formula I, and on other factors known to individuals skilled in the art with the benefit of this disclosure.

In addition, the viscosified treatment fluids of the present invention may further comprise a buffer. Buffers may be used to maintain a viscosified treatment fluid's pH in a limited range. Examples of suitable buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. The buffer generally is present in the viscosified treatment fluids of the present invention in an amount sufficient to maintain the pH of such viscosified treatment fluids at a desired level. One of ordinary skill in the art, with the benefit of this disclosure, will recognize the appropriate buffer and amount of the buffer to use for a chosen application.

The viscosified treatment fluids of the present invention optionally may comprise particulates suitable for subterranean applications. Suitable particulates include, but are not limited to, gravel, natural sand, quartz sand, particulate garnet, glass, ground walnut hulls, nylon pellets, aluminum pellets, bauxite, ceramics, polymeric materials, combinations thereof, and the like. In some embodiments, these particulates may be coated with resins, tackifiers, or both, if desired, e.g., to consolidate the particulates downhole. One having ordinary skill in the art, with the benefit of this disclosure, will recognize the particulate type, size, and amount to use in conjunction with the viscosified treatment fluids of the present invention to achieve a desired result. In certain exemplary embodiments, the particulates used may be included in the viscosified treatment fluid to form a gravel pack downhole or as a proppant in fracturing operations.

Additional additives may be added to the viscosified treatment fluids of the present invention as deemed appropriate by one skilled in the art with the benefit of this disclosure. Examples of such additives include, but are not limited to, fluid loss control agents, surfactants, weighting agents, scale inhibitors, clay stabilizers, silicate-control agents, antifoaming agents, foaming agents, biocides, biostatic agents, storage stabilizers, and combinations thereof.

The viscosified treatment fluids of the present invention can be utilized for carrying out a variety of subterranean well treatments, including, but not limited to, fracturing and gravel packing subterranean formations. In certain embodiments in which the viscosified treatment fluids of the present invention are used in conjunction with fracturing operations, fracturing fluids comprising water and a crosslinked gelling agent, the crosslinked gelling agent being formed by a reaction comprising a gelling agent and a boronic acid crosslinking agent of the present invention, may be placed in a subterranean formation so as to create or enhance one or more fractures therein. After the fracturing fluid has performed its desired function, or after a desired time, the viscosity of the fracturing fluid may be reduced and the fluid recovered.

In certain embodiments in which the viscosified treatment fluids of the present invention are used in conjunction with gravel packing operations, gravel packing fluids comprising water, gravel, and a crosslinked gelling agent, the crosslinked gelling agent being formed by a reaction comprising a gelling agent and a boronic acid crosslinking agent of the present invention, may be placed in or near a portion of a subterranean formation so as to create a gravel pack. After the gravel pack is substantially in place, the viscosity of the gravel packing fluid may be reduced to a desired degree.

The present invention also provides methods of reusing viscosified treatment fluids or any component, or combination of components, therein. In general, the viscosified treatment fluids of the present invention can be reused because gelling agents crosslinked using the boronic acid crosslinking agents of the present invention can be delinked. In certain embodiments, reuse of the viscosified treatment fluids of the present invention, which comprise crosslinked gelling agents, involves delinking the crosslinked gelling agents to a sufficient degree so as to remove the crosslinks to at least one gelling agent molecule thereby forming a "delinked gelling agent." These delinked gelling agents may then be crosslinked, e.g., to increase the viscosity of the same or a different viscosified treatment fluid. In certain embodiments, one or more components of a viscosified treatment fluid comprising delinked gelling agents may be reused. For example, the gelling agent or the water of a viscosified treatment fluid may be reused. Reusing viscosified treatment fluids is described U.S. patent application Ser. No. 10/794,607 titled "Methods and Compositions for Reducing the Viscosity of Treatment Fluids" filed Mar. 5, 2004, the relevant disclosures of which is incorporated herein by reference.

An example of a method of the present invention is a method of forming a viscosified treatment fluid comprising: providing a treatment fluid that comprises water and a gelling agent; contacting the treatment fluid with a boronic acid crosslinking agent so as to form a crosslinked gelling agent, wherein the boronic acid crosslinking agent comprises a compound having the formula:

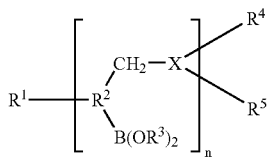

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH + R'B(OR)_2$ ? $R'OH + B(OR)_3$; R, R', and $R^3$ can be hydrogens, alkyl groups, aryl groups, or combinations thereof, wherein R, R', and $R^3$ can be the same or different; $—B(OR^3)_2$ can be a boronic acid group; and n is a positive integer greater than or equal to one.

Another example of a method of the present invention is a method of forming a viscosified treatment fluid comprising: providing a treatment fluid that comprises water and a gelling agent; contacting the treatment fluid with a boronic acid crosslinking agent so as to form a crosslinked gelling agent, wherein the boronic acid crosslinking agent comprises a compound having the formula:

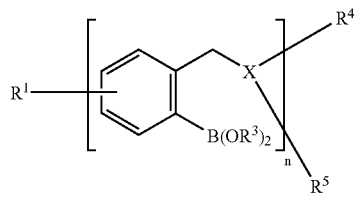

wherein X can be a Lewis base; $R^1$, $R^4$, and $R^5$ can be heteroatoms, organic fragments, or combinations thereof, wherein $R^1$, $R^4$, and $R^5$ can be the same or different; $—B(OR^3)_2$ can be a boronic acid group; $R^3$ can be hydrogen, an alkyl group, an aryl group, or a combination thereof; and n is a positive integer greater than or equal to one.

Another example of a method of the present invention is a method of forming a viscosified treatment fluid comprising: providing a treatment fluid that comprises water and a gelling agent; contacting the treatment fluid with a boronic acid crosslinking agent so as to form a crosslinked gelling agent, wherein the boronic acid crosslinking agent comprises a compound having the formula:

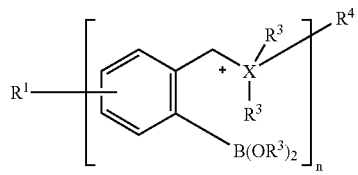

wherein X can be a Lewis base; $R^1$ and $R^4$ can be heteroatoms, organic fragments, or combinations thereof, wherein $R^1$ and $R^4$ can be the same or different; $—B(OR^3)_2$ can be a boronic acid group; $R^3$ can be hydrogen, an alkyl group, an aryl group, or a combination thereof; and n is a positive integer greater than or equal to one.

Another example of a method of the present invention is a method of forming a viscosified treatment fluid comprising: providing a treatment fluid that comprises water and a gelling agent; and contacting the treatment fluid with a boronic acid crosslinking agent so as to form a crosslinked gelling agent, wherein the boronic acid crosslinking agent comprises a compound having the formula:

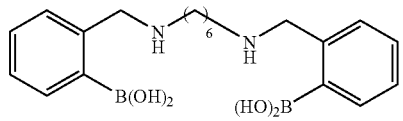

Another example of a method of the present invention is a method of crosslinking gelling agent molecules comprising: contacting at least two gelling agent molecules with a boronic acid crosslinking agent, wherein the boronic acid crosslinking agent comprises a compound having the formula:

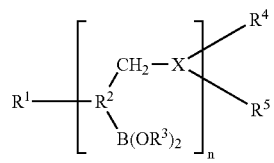

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH + R'B(OR)_2$ ? $R'OH + B(OR)_3$; R, R', and $R^3$ can be hydrogens, alkyl groups, aryl groups, or combinations thereof, wherein R, R', and $R^3$ can be the same or different; $—B(OR^3)_2$ can be a boronic acid group; and n is a positive integer greater than or equal to one.

Another example of a method of the present invention is a method of crosslinking gelling agent molecules comprising: contacting at least two gelling agent molecules with a boronic acid crosslinking agent, wherein the boronic acid crosslinking agent comprises a compound having the formula:

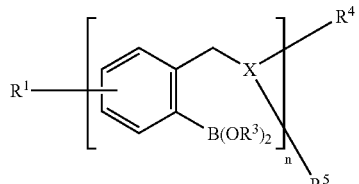

wherein X can be a Lewis base; $R^1$, $R^4$, and $R^5$ can be heteroatoms, organic fragments, or combinations thereof, wherein $R^1$, $R^4$, and $R^5$ can be the same or different; $—B(OR_3)_2$ can be a boronic acid group; $R^3$ can be hydrogen, an alkyl group, an aryl group, or a combination thereof; and n is a positive integer greater than or equal to one.

Another example of a method of the present invention is a method of crosslinking gelling agent molecules comprising: contacting at least two gelling agent molecules with a boronic acid crosslinking agent, wherein the boronic acid crosslinking agent comprises a compound having the formula:

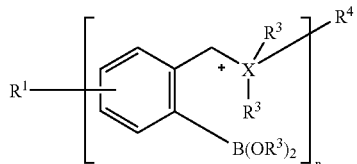

wherein X can be a Lewis base; $R^1$ and $R^4$ can be heteroatoms, organic fragments, or combinations thereof, wherein $R^1$ and $R^4$ can be the same or different; $-B(OR^3)_2$ can be a boronic acid group; $R^3$ can be hydrogen, an alkyl group, an aryl group, or a combination thereof; and n is a positive integer greater than or equal to one.

Another example of a method of the present invention is a method of crosslinking gelling agent molecules comprising: contacting at least two gelling agent molecules with a boronic acid crosslinking agent, wherein the boronic acid crosslinking agent comprises a compound having the formula:

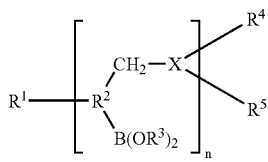

Another example of a method of the present invention is a method of treating a subterranean formation comprising: providing a viscosified treatment fluid that comprises water and a crosslinked gelling, the crosslinked gelling agent being formed by a reaction comprising a gelling agent and a boronic acid crosslinking agent comprising a compound having the formula:

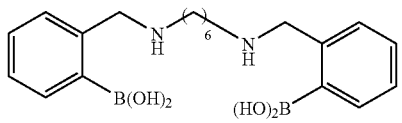

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH+R'B(OR)_2 \rightleftharpoons R'OH+B(OR)_3$; R, R', and $R^3$ can be hydrogens, alkyl groups, aryl groups, or combinations thereof, wherein R, R', and $R^3$ can be the same or different; $-B(OR^3)_2$ can be a boronic acid group; n is a positive integer greater than or equal to one; and treating the subterranean formation.

Another example of a method of the present invention is a method of treating a subterranean formation comprising: providing a viscosified treatment fluid that comprises water and a crosslinked gelling agent, the crosslinked gelling agent being formed by a reaction comprising a gelling agent and a boronic acid crosslinking agent comprising a compound having the formula:

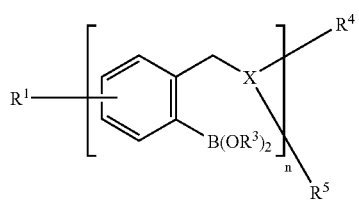

wherein X can be a Lewis base; $R^1$, $R^4$, and $R^5$ can be heteroatoms, organic fragments, or combinations thereof, wherein $R^1$, $R^4$, and $R^5$ can be the same or different; $-B(OR^3)_2$ can be a boronic acid group; $R^3$ can be hydrogen, an alkyl group, an aryl group, or a combination thereof; and n is a positive integer greater than or equal to one.

Another example of a method of the present invention is a method of treating a subterranean formation comprising: providing a viscosified treatment fluid that comprises water and a crosslinked gelling agent, the crosslinked gelling agent being formed by a reaction comprising a gelling agent and a boronic acid crosslinking agent comprising a compound having the formula:

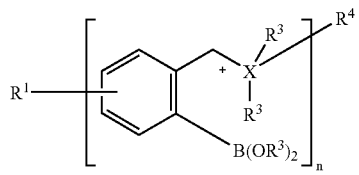

wherein X can be a Lewis base; $R^1$ and $R^4$ can be heteroatoms, organic fragments, or combinations thereof, wherein $R^1$ and $R^4$ can be the same or different; $-B(OR^3)_2$ can be a boronic acid group; $R^3$ can be hydrogen, an alkyl group, an aryl group, or a combination thereof; and n is a positive integer greater than or equal to one.

Another example of a method of the present invention is a method of treating a subterranean formation comprising: providing a viscosified treatment fluid that comprises water and a crosslinked gelling agent, the crosslinked gelling agent being formed by a reaction comprising a gelling agent and a boronic acid crosslinking agent comprising a compound having the formula:

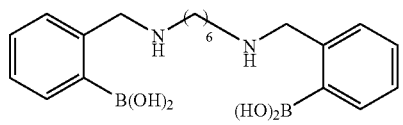

Another example of a method of the present invention is a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

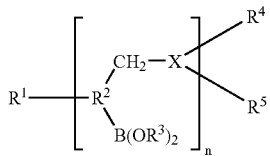

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH+R'B(OR)_2$ ? $R'OH+B(OR)_3$; R, R', and $R^3$ can be hydrogens, alkyl groups, aryl groups, or combinations thereof, wherein R, R', and $R^3$ can be the same or different; $—B(OR^3)_2$ can be a boronic acid group; n is a positive integer greater than or equal to one; adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

Another example of a method of the present invention is a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

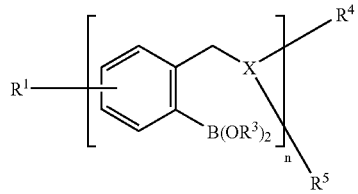

wherein X can be a Lewis base; $R^1$, $R^4$, and $R^5$ can be heteroatoms, organic fragments, or combinations thereof, wherein $R^1$, $R^4$, and $R^5$ can be the same or different; $—B(OR^3)_2$ can be a boronic acid group; $R^3$ can be hydrogen, an alkyl group, an aryl group, or a combination thereof; n is a positive integer greater than or equal to one; adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

Another example of a method of the present invention is a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

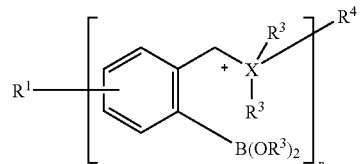

wherein X can be a Lewis base; $R^1$ and $R^4$ can be heteroatoms, organic fragments, or combinations thereof, wherein $R^1$ and $R^4$ can be the same or different; $—B(OR^3)_2$ can be a boronic acid group; $R^3$ can be hydrogen, an alkyl group, an aryl group, or a combination thereof; n is a positive integer greater than or equal to one; adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

Another example of a method of the present invention is a method of reusing a viscosified treatment fluid comprising: providing a first viscosified treatment fluid that comprises water and a first crosslinked gelling agent, the first crosslinked gelling agent being formed from a reaction comprising a gelling agent and a boronic acid crosslinking agent comprising a compound having the formula:

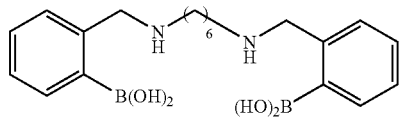

adjusting the pH of the first viscosified treatment fluid; allowing at least a portion of the first crosslinked gelling agent in the first viscosified treatment fluid to delink to form delinked gelling agents; crosslinking at least two delinked gelling agents to form a second crosslinked gelling agent to form a second viscosified treatment fluid; and using the second viscosified treatment fluid in a chosen application.

Another example of a method of the present invention is a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

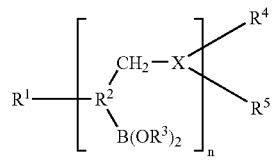

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: $ROH+R'B(OR)_2$ ? $R'OH+B$ (OR)$_3$; R, R', and R$^3$ can be hydrogens, alkyl groups, aryl groups, or combinations thereof, wherein R, R', and R$^3$ can be the same or different; —B(OR$^3$)$_2$ can be a boronic acid group; n is a positive integer greater than or equal to one; and placing the viscosified treatment fluid in a subterranean formation at a pressure sufficient to create or enhance one or more fractures therein.

Another example of a method of the present invention is a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

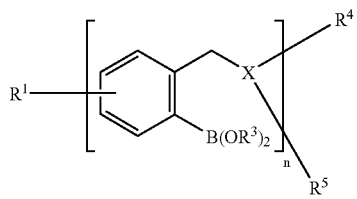

wherein X can be a Lewis base; R$^1$, R$^4$, and R$^5$ can be heteroatoms, organic fragments, or combinations thereof, wherein R$^1$, R$^4$, and R$^5$ can be the same or different; —B(OR$^3$)$_2$ can be a boronic acid group; R$^3$ can be hydrogen, an alkyl group, an aryl group, or a combination thereof; n is a positive integer greater than or equal to one; and placing the viscosified treatment fluid in a subterranean formation at a pressure sufficient to create or enhance one or more fractures therein.

Another example of a method of the present invention is a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

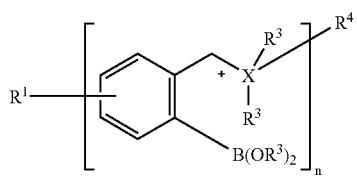

wherein X can be a Lewis base; R$^1$ and R$^4$ can be heteroatoms, organic fragments, or combinations thereof, wherein R$^1$ and R$^4$ can be the same or different; —B(OR$^3$)$_2$ can be a boronic acid group; R$^3$ can be hydrogen, an alkyl group, an aryl group, or a combination thereof; n is a positive integer greater than or equal to one; and placing the viscosified treatment fluid in a subterranean formation at a pressure sufficient to create or enhance one or more fractures therein.

Another example of a method of the present invention is a method for fracturing a subterranean formation comprising: providing a viscosified treatment fluid that comprises water and a crosslinked gelling agent, the crosslinked gelling agent being formed from a reaction comprising a gelling agent and a boronic acid crosslinking agent comprising a compound having the formula:

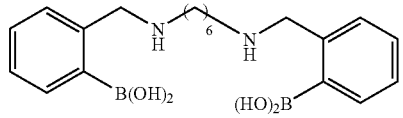

; and placing the viscosified treatment fluid in a subterranean formation at a pressure sufficient to create or enhance one or more fractures therein.

Another example of a method of the present invention is a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

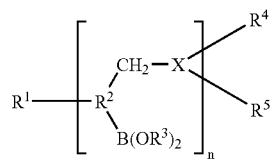

wherein X can be a Lewis base; R$^1$, R$^4$, and R$^5$ can be heteroatoms, organic fragments, or combinations thereof, wherein R$^1$, R$^4$, and R$^5$ can be the same or different; R$^2$ can be at least partially capable of preventing or inhibiting a reaction represented by Reaction 1: ROH+R'B(OR)$_2$ ? R'OH+B (OR)$_3$; R, R', and R$^3$ can be hydrogens, alkyl groups, aryl groups, or combinations thereof, wherein R, R', and R$^3$ can be the same or different; —B(OR$^3$)$_2$ can be a boronic acid group; n is a positive integer greater than or equal to one; and placing the viscosified treatment fluid in or near a portion of the subterranean formation so as to create a gravel pack.

Another example of a method of the present invention is a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

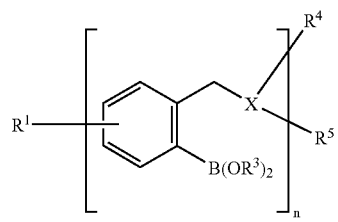

wherein X can be a Lewis base; R$^1$, R$^4$, and R$^5$ can be heteroatoms, organic fragments, or combinations thereof, wherein R$^1$, R$^4$, and R$^5$ can be the same or different; —B(OR$^3$)$_2$ can be a boronic acid group; R$^3$ can be hydrogen, an alkyl group, an aryl group, or a combination thereof; n is a positive integer greater than or equal to one; and placing the viscosified treatment fluid in or near a portion of the subterranean formation so as to create a gravel pack.

Another example of a method of the present invention is a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

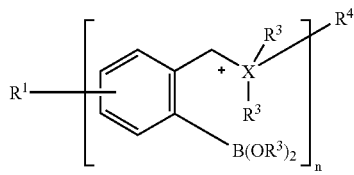

wherein X can be a Lewis base; $R^1$ and $R^4$ can be heteroatoms, organic fragments, or combinations thereof, wherein $R^1$ and $R^4$ can be the same or different; —$B(OR^3)_2$ can be a boronic acid group; $R^3$ can be hydrogen, an alkyl group, an aryl group, or a combination thereof; n is a positive integer greater than or equal to one; and placing the viscosified treatment fluid in or near a portion of the subterranean formation so as to create a gravel pack.

Another example of a method of the present invention is a method for placing a gravel pack in a subterranean formation comprising: providing a viscosified treatment fluid that comprises water, gravel, and a crosslinked gelling agent, the crosslinked gelling agent being formed by a reaction comprising a gelling agent and a boronic acid crosslinking agent comprising a compound having the formula:

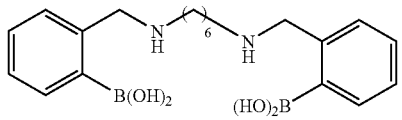

; and placing the viscosified treatment fluid in or near a portion of the subterranean formation so as to create a gravel pack.

An example of a composition of the present invention is a boronic acid crosslinking agent comprising a compound having the formula:

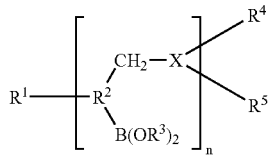

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: ROH+R'B(OR)$_2$ ? R'OH+B (OR)$_3$; R, R', and $R^3$ can be hydrogens, alkyl groups, aryl groups, or combinations thereof, wherein R, R', and $R^3$ can be the same or different; —$B(OR^3)_2$ can be a boronic acid group; and n is a positive integer greater than or equal to one.

Another example of a composition of the present invention is a boronic acid crosslinking agent comprising a compound having the formula:

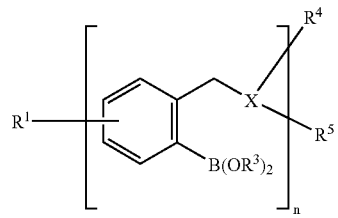

wherein X can be a Lewis base; $R^1$, $R^4$, and $R^5$ can be heteroatoms, organic fragments, or combinations thereof, wherein $R^1$, $R^4$, and $R^5$ can be the same or different; —$B(OR^3)_2$ can be a boronic acid group; $R^3$ can be hydrogen, an alkyl group, an aryl group, or a combination thereof; and n is a positive integer greater than or equal to one.

Another example of a composition of the present invention is a boronic acid crosslinking agent comprising a compound having the formula:

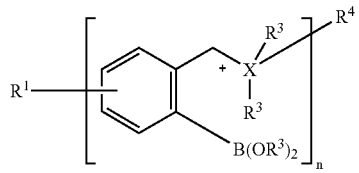

wherein X can be a Lewis base; $R^1$ and $R^4$ can be heteroatoms, organic fragments, or combinations thereof, wherein $R^1$ and $R^4$ can be the same or different; —$B(OR^3)_2$ can be a boronic acid group; $R^3$ can be hydrogen, an alkyl group, an aryl group, or a combination thereof; and n is a positive integer greater than or equal to one.

Another example of a composition of the present invention is a boronic acid crosslinking agent comprising a compound having the formula:

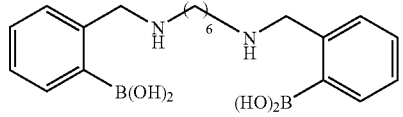

Another example of a composition of the present invention is a viscosified treatment fluid comprising a crosslinked gelling agent, the crosslinked gelling agent being formed from a reaction comprising a gelling agent and a boronic acid crosslinking agent comprising a compound having the formula:

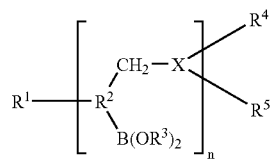

wherein X can be a Lewis base; $R^1$, $R^4$, and $R^5$ can be heteroatoms, organic fragments, or combinations thereof, wherein $R^1$, $R^4$, and $R^5$ can be the same or different; $R^2$ can be at least partially capable of preventing or inhibiting a reaction represented by Reaction 1: ROH+R'B(OR)$_2$ ? R'OH+B(OR)$_3$; R, R', and $R^3$ can be hydrogens, alkyl groups, aryl groups, or combinations thereof, wherein R, R', and $R^3$ can be the same or different; —B(OR$^3$)$_2$ can be a boronic acid group; and n is a positive integer greater than or equal to one.

Another example of a composition of the present invention is a viscosified treatment fluid comprising a crosslinked gelling agent, the crosslinked gelling agent being formed from a reaction comprising a gelling agent and a boronic acid crosslinking agent comprising a compound having the formula:

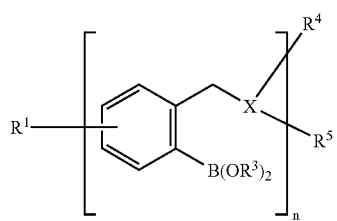

wherein X can be a Lewis base; $R^1$, $R^4$, and $R^5$ can be heteroatoms, organic fragments, or combinations thereof, wherein $R^1$, $R^4$, and $R^5$ can be the same or different; —B(OR$^3$)$_2$ can be a boronic acid group; $R^3$ can be hydrogen, an alkyl group, an aryl group, or a combination thereof; and n is a positive integer greater than or equal to one.

Another example of a composition of the present invention is a viscosified treatment fluid comprising a crosslinked gelling agent, the crosslinked gelling agent being formed from a reaction comprising a gelling agent and a boronic acid crosslinking agent comprising a compound having the formula:

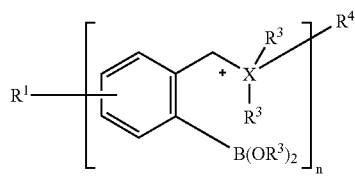

wherein X can be a Lewis base; $R^1$ and $R^4$ can be heteroatoms, organic fragments, or combinations thereof, wherein $R^1$ and $R^4$ can be the same or different; —B(OR$^3$)$_2$ can be a boronic acid group; $R^3$ can be hydrogen, an alkyl group, an aryl group, or a combination thereof; and n is a positive integer greater than or equal to one.

Another example of a composition of the present invention is a viscosified treatment fluid comprising a crosslinked gelling agent, the crosslinked gelling agent being formed from a reaction comprising a gelling agent and a boronic acid crosslinking agent comprising a compound having the formula:

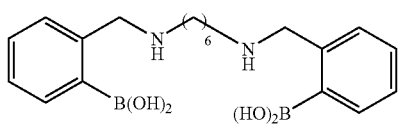

To facilitate a better understanding of the present invention, the following examples of specific embodiments are given. In no way should the following examples be read to limit, or to define, the scope of the invention.

EXAMPLES

An exemplary boronic acid crosslinking agent was prepared as follows. Hexamethylenediamine dihydrochloride (CAS No.: 6055-52-3) was dissolved in a minimum amount of 1 Normal NaOH and added to 200 mL of toluene. Water was removed from this solution by azeotropic distillation so that the free-based amine was freely soluble in the solvent. Aliquots of solid 2-formylphenylboronic acid (CAS No.: 40138-16-7) (2.71 g, 18 mol) were added to the solution and reacted under reflux. Thin layer chromatography was used to monitor when the reaction was completed. Once completed, the reaction was hot filtered. The solvent was removed from the filtrate in vacuo, or it was allowed to crystallize slowly at room temperature for characterization of the intermediate diimine. The filtrate was then added to sodium borohydride (CAS No.: 16940-66-2) (0.87 g, 21.5 mmol) followed by 50 mL of methanol. A precipitate formed and was filtered. The precipitate was characterized as a white solid in 42% yield. The precipitate was the reaction product formed from the reaction in methanol, which was isolated as the tetra borate ester, and was observed by NMR (Bruker 300 MHz UltraShield™). Within the experimental conditions of the LC-MS (Agilent 1100 Series LC/MSD), the reaction product lost 2 molecules of water giving an M-36 peak. The reaction product had the following characteristics. $^1$H NMR (CD$_3$OD/CDCl$_3$, 1:1): δ 1.46 (4H, bm); 1.76 (4H, bm); 3.37 (12H, bs); 3.94 (4H, bs); 4.61 (4H, bs); 7.06-7.16 (6H, m); 7.45-7.50 (2H, m). $^{13}$C NMR (CD$_3$OD/CDCl$_3$, 1:1): δ 26.60, 26.66, 53.79, 69.25, 120.01, 122.82, 126.61, 127.21, 129.09, 130.40. LC-MS: (pos) 349.5.

The exemplary boronic acid crosslinking agent prepared as described above was compared to 1,4-phenylene diboronic acid and boric acid using a pH titration that was performed according to the method of S. L. Wiskur, et al., Org. Lett., 3(9):1311-14 (2001). The comparison is shown in FIG. 1 and Table 1 and indicates that the exemplary boronic acid crosslinking agent had multiple pKas.

TABLE 1

| NaOH (μL) | pH | | |
|---|---|---|---|
| | Exemplary boronic acid crosslinking agent | 1,4-phenylene diboronic acid | Boric acid |
| 0 | 2.92 | 3.32 | 3.03 |
| 1 | 2.97 | 3.47 | 3.13 |
| 2 | 3.04 | 3.67 | 3.25 |
| 3 | 3.12 | 4.07 | 3.4 |
| 4 | 3.21 | 5.66 | 3.64 |
| 5 | 3.32 | 6.6 | 4.06 |
| 6 | 3.46 | 6.97 | 6.08 |
| 7 | 3.65 | 7.18 | 7.58 |
| 8 | 3.86 | 7.33 | 7.91 |
| 9 | 4.08 | 7.44 | 8.11 |
| 10 | 4.26 | 7.53 | 8.26 |
| 11 | 4.41 | 7.62 | 8.39 |
| 12 | 4.53 | 7.69 | 8.49 |
| 13 | 4.64 | 7.76 | 8.59 |
| 14 | 4.73 | 7.82 | 8.67 |
| 15 | 4.81 | 7.88 | 8.74 |
| 16 | 4.89 | 7.94 | 8.82 |
| 17 | 4.96 | 8 | 8.89 |
| 18 | 5.03 | 8.05 | 8.96 |
| 19 | 5.09 | 8.11 | 9.03 |
| 20 | 5.16 | 8.17 | 9.1 |
| 21 | 5.22 | 8.21 | 9.17 |
| 22 | 5.28 | 8.25 | 9.25 |

TABLE 1-continued

| NaOH (µL) | pH Exemplary boronic acid crosslinking agent | 1,4-phenylene diboronic acid | Boric acid |
|---|---|---|---|
| 23 | 5.44 | 8.39 | 9.31 |
| 24 | 5.48 | 8.46 | 9.38 |
| 25 | 5.55 | 8.51 | 9.47 |
| 26 | 5.66 | 8.57 | 9.55 |
| 27 | 5.72 | 8.64 | 9.65 |
| 28 | 5.8 | 8.7 | 9.74 |
| 29 | 5.86 | 8.76 | 9.85 |
| 30 | 5.94 | 8.82 | 9.95 |
| 31 | 6.02 | 8.96 | 10.05 |
| 32 | 6.11 | 9.02 | 10.13 |
| 33 | 6.21 | 9.09 | 10.22 |
| 34 | 6.33 | 9.15 | 10.29 |
| 35 | 6.48 | 9.21 | 10.35 |
| 36 | 6.69 | 9.26 | 10.4 |
| 37 | 6.99 | 9.32 | 10.45 |
| 38 | 7.6 | 9.38 | 10.49 |
| 39 | 8.79 | 9.43 | 10.53 |
| 40 | 9.39 | 9.47 | 10.56 |
| 41 | 9.72 | 9.51 | 10.59 |
| 42 | 9.96 | 9.56 | 10.62 |
| 43 | 10.14 | 9.6 | 10.65 |
| 44 | 10.27 | 9.64 | 10.68 |
| 45 | 10.37 | 9.68 | 10.7 |
| 46 | 10.45 | 9.71 | 10.71 |
| 47 | 10.52 | 9.75 | 10.75 |
| 48 | 10.58 | 9.79 | 10.77 |
| 49 | 10.62 | 9.82 | 10.78 |
| 50 | 10.66 | 9.86 | 10.78 |
| 51 | 10.76 | 9.89 | 10.81 |
| 52 | 10.78 | 9.93 | 10.82 |
| 53 | 10.8 | 9.96 | 10.82 |
| 54 | 10.82 | 10 | 10.85 |
| 55 | 10.84 | 10.03 | 10.85 |
| 56 | 10.85 | 10.06 | 10.87 |
| 57 | 10.87 | 10.1 | 10.87 |
| 58 | 10.88 | 10.13 | 10.89 |
| 59 | 10.9 | 10.16 | 10.89 |
| 60 | 10.9 | 10.19 | 10.91 |
| 61 | 10.9 | 10.23 | 10.92 |
| 62 | 10.92 | 10.26 | 10.92 |
| 63 | 10.94 | 10.28 | 10.92 |
| 64 | 10.95 | 10.3 | 10.95 |
| 65 | 10.95 | 10.33 | 10.95 |
| 66 | 10.95 | 10.33 | 10.95 |
| 67 | 10.97 | 10.37 | 10.97 |
| 68 | 10.97 | 10.39 | 10.97 |
| 69 | 10.97 | 10.42 | 11 |
| 70 | 11 | 10.44 | 11 |
| 71 | 11 | 10.47 | 11 |
| 72 | 11 | 10.49 | 11 |
| 73 | 11.01 | 10.49 | 11 |
| 74 | 11.02 | 10.53 | 11 |
| 75 | 11.05 | 10.55 | 11.03 |
| 76 | 11.05 | 10.55 | 11.03 |
| 77 | 11.06 | 10.57 | 11.03 |

Figure 2:
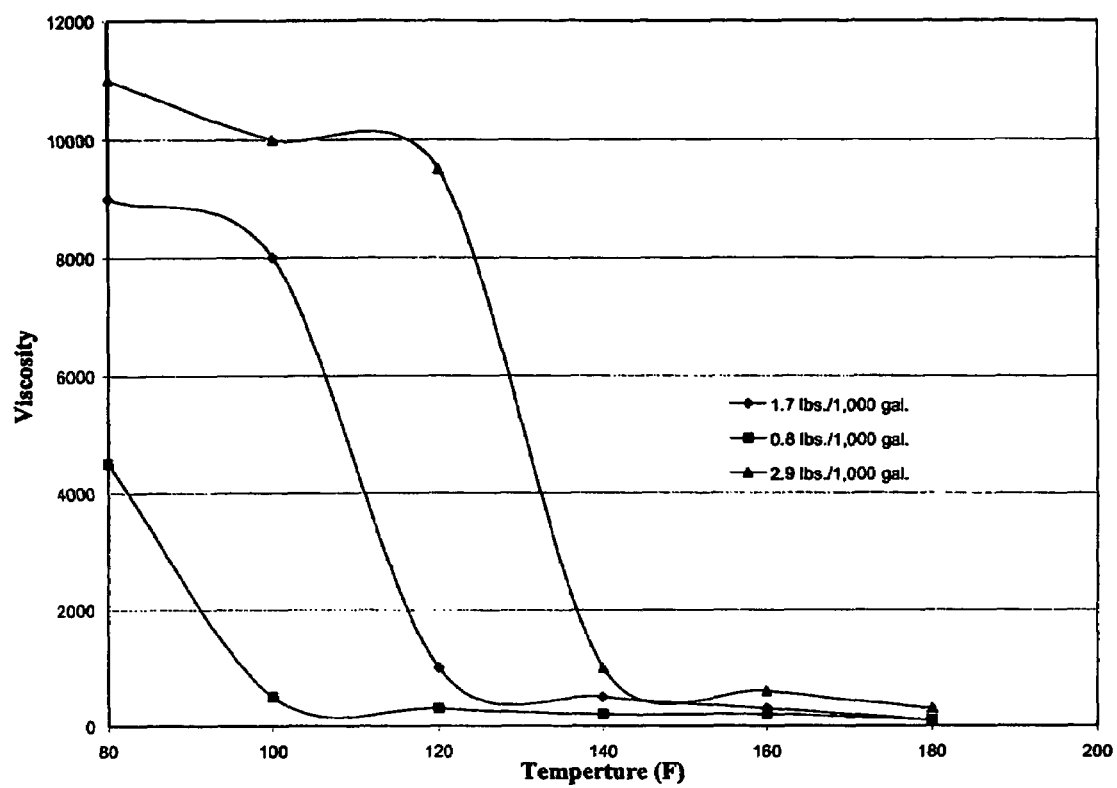
FIG. 2 illustrates a graph of the change the viscosity as a function of temperature.

Exemplary viscosified treatment fluids of the present invention were prepared using the exemplary boronic acid crosslinking agent described above. The exemplary vicosified treatment fluids were prepared using 25 pounds/1,000 gallons of a guar gelling agent in 2% KCl and 0.8, 1.7 and 2.9 pounds/1,000 gallons of the exemplary boronic acid crosslinking agent. FIG. 2 and Table 1 shows the viscosities of the resultant exemplary viscosified treatment fluids as a function of temperature.

TABLE 2

| Temperature (° F.) | Viscosity (cP) 0.8 lbs./1,000 gal. | 1.7 lbs./1,000 gal. | 2.9 lbs./1,000 gal. |
|---|---|---|---|
| 80 | 4,500 | 9,000 | 11,000 |
| 100 | 500 | 8,000 | 10,000 |
| 120 | 300 | 1,000 | 9,500 |
| 140 | 200 | 500 | 1,000 |
| 160 | 200 | 300 | 600 |
| 180 | 100 | 100 | 300 |

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of forming a viscosified treatment fluid comprising:
   providing a treatment fluid that comprises water and a gelling agent;
   contacting the treatment fluid with a boronic acid crosslinking agent so as to form a reversibly crosslinked gelling agent, wherein the boronic acid crosslinking agent comprises a compound having the formula:

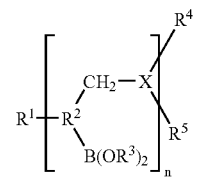

wherein
   X can be a Lewis base;
   $R^1$, $R^4$, and $R^5$ are selected from the group consisting of: heteroatoms, organic fragments, or combinations thereof, wherein $R^1$, $R^4$, and $R^5$ can be the same or different;
   $R^2$ is selected from the group consisting of an aryl group, a polyether and a spacer group;
   R, R', and $R^3$ are selected from the group consisting of: hydrogens, alkyl groups, aryl groups, or combinations thereof, wherein R, R', and $R^3$ can be the same or different;
   —$B(OR^3)_2$ can be a boronic acid group; and
   n is a positive integer greater than or equal to one.

2. The method of claim 1 wherein n is in the range of from 1 to about 100.

3. The method of claim 1 wherein $R^1$, $R^4$, or $R^5$ comprises at least one group selected from the group consisting of: an alcohol, an alkyl group, an aryl group, and a combination thereof.

4. The method of claim 1 wherein $R^2$ comprises a group capable of stabilizing a boronic acid group.

5. The method of claim 4 wherein $R^2$ comprises an aryl group.

6. The method of claim 1 wherein $R^2$ comprises a polyether.

7. The method of claim 6 wherein the polyether comprises a compound having the formula:

$$-\!\!\!-\!\!\!\left(CH_2CH_2O\right)_{\!q}\!\!\!-\!\!\!-$$

wherein q is a positive integer greater than or equal to one.

8. The method of claim 7 wherein q is an integer between 1 and about 30.

9. The method of claim 1 wherein $R^2$ comprises a spacer group

10. The method of claim 9 wherein $R^2$ comprises a compound having the formula:

$$-\!\!\!-\!\!\!\left(CH_2\right)_r O\!\!\!-\!\!\!-$$

wherein r is a positive integer greater than or equal to one.

11. The method of claim 10 wherein r is an integer between 1 and about 30.

12. The method of claim 10 wherein any methylene is substituted by at least one component selected from the group consisting of: an epoxide ring, an alkyl halide, a carbonyl group, an amido group, oxygen, sulfur, and a combination thereof.

13. The method of claim 1 wherein the boronic acid group and the X group are capable of interacting so as to lower the complexation pKa of boron.

14. The method of claim 1 wherein X is capable of having a lone pair of electrons.

15. The method of claim 1 wherein X is a heteroatom.

16. The method of claim 1 wherein X comprises nitrogen.

17. The method of claim 1 wherein X is selected from the group consisting of: a primary group, a secondary group, or a tertiary group.

18. The method of claim 1 wherein the boronic acid crosslinking agent comprises an equilibrium species.

19. The method of claim 1 wherein the boronic acid crosslinking agent is encapsulated.

20. The method of claim 1 wherein the boronic acid crosslinking agent comprises a degradable material.

21. The method of claim 20 wherein the degradable material comprises at least one degradable material selected from the group consisting of: dextran, cellulose, a chitin, a chitosan, a liquid ester, a protein, an aliphatic polyester, a poly (lactide), a poly(glycolide), a poly(e-caprolactone), a poly (hydroxybutyrate), a poly(anhydride), an aliphatic poly (carbonate), an ortho ester, a poly(orthoester), a poly(amino acid), a poly (ethylene oxide), a poly(phosphazene), and a combination thereof.

22. The method of claim 1 wherein the water comprises at least one water selected from the group consisting of: fresh water, saltwater, brine, seawater, and a combination thereof.

23. The method of claim 1 wherein the viscosified treatment fluid is suitable for use in subterranean operations.

24. The method of claim 23 wherein the viscosified treatment fluid comprises at least one viscosified treatment fluid selected from the group consisting of: a fracturing fluid, a gravel packing fluid, and a combination thereof.

25. The method of claim 1 wherein the viscosified treatment fluid is a drilling fluid.

26. The method of claim 1 wherein the gelling agent comprises at least one gelling agent selected from the group consisting of: a polymer, an oligomer, and a monomer of a biopolymer.

27. The method of claim 1 wherein the gelling agent comprises at least one gelling agent selected from the group consisting of: a polymer, an oligomer, and a monomer of a synthetic polymer.

28. The method of claim 1 wherein the gelling agent is present in the viscosified treatment fluid in an amount in the range of from about 0.03% to about 1% by weight of the water therein.

29. The method of claim 1 wherein the boronic acid crosslinking agent is present in the treatment fluid in an amount sufficient to provide the desired degree of crosslinking between gelling agent molecules.

30. The method of claim 1 wherein the boronic acid crosslinking agent is present in the treatment fluid in an amount in the range of from about 0.003% to about 1% by weight of the water therein.

31. The method of claim 1 wherein the viscosified treatment fluid further comprises at least one component selected from the group consisting of: pH-adjusting agent, a breaker, a buffer, particulates, or a combination thereof.

32. The method of claim 31 wherein the particulates comprise at least one particulate material selected from the group consisting of: gravels, natural sands, quartz sands, particulate garnets, glasses, ground walnut hulls, nylon pellets, aluminum pellets, bauxites, ceramics, polymeric materials, or a combination thereof.

33. The method of claim 32 wherein the particulates comprise at least one material selected from the group consisting of: a resin, a tackifier, and a combination thereof.

34. A method of forming a viscosified treatment fluid comprising:

providing a treatment fluid that comprises water and a gelling agent;

contacting the treatment fluid with a boronic acid crosslinking agent so as to form a reversibly crosslinked gelling agent, wherein the boronic acid crosslinking agent comprises a compound having the formula:

$$R^1 \!\!-\!\!\!\left[\!\!\begin{array}{c}\phantom{x}\\ \text{\large{\textcircled{}}}\end{array}\!\!-\!CH_2\!-\!X\!\!\begin{array}{c}R^4\\ \diagup\\ \diagdown\\ R^5\end{array}\!\!\right]_{\!n}$$
$$\phantom{xxxxxxxxxxxxx}B(OR^3)_2$$

wherein

X can be a Lewis base;

$R^1$, $R^4$, and $R^5$ can be heteroatoms, organic fragments, or combinations thereof, wherein $R^1$, $R^4$, and $R^5$ can be the same or different;

—$B(OR^3)_2$ can be a boronic acid group;

$R^3$ can be hydrogen, an alkyl group, an aryl group, or a combination thereof; and n is a positive integer greater than or equal to one.

35. A method of forming a viscosified treatment fluid comprising:

providing a treatment fluid that comprises water and a gelling agent;

contacting the treatment fluid with a boronic acid crosslinking agent so as to form a reversibly crosslinked gelling agent, wherein the boronic acid crosslinking agent comprises a compound having the formula:

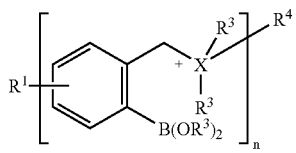

wherein
X can be a Lewis base;
R$^1$ and R$^4$ can be heteroatoms, organic fragments, or combinations thereof, wherein R$^1$ and R$^4$ can be the same or different;
—B(OR$^3$)$_2$ can be a boronic acid group;
R$^3$ can be hydrogen, an alkyl group, an aryl group, or a combination thereof; and
n is a positive integer greater than or equal to one.

36. A method of forming a viscosified treatment fluid comprising:
providing a treatment fluid that comprises water and a gelling agent; and
contacting the treatment fluid with a boronic acid crosslinking agent so as to form a crosslinked gelling agent, wherein the boronic acid crosslinking agent comprises a compound having the formula:

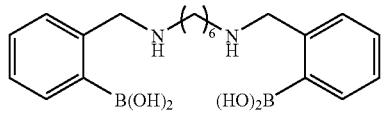

37. A method of treating a subterranean formation comprising:
providing a viscosified treatment fluid that comprises water and a crosslinked gelling, the crosslinked gelling agent being formed by a reaction comprising a gelling agent and a boronic acid crosslinking agent comprising a compound having the formula:

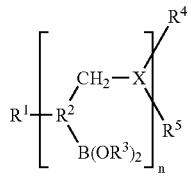

wherein
X can be a Lewis base;
R$^1$, R$^4$, and R$^5$ are selected from the group consisting of: heteroatoms, organic fragments, or combinations thereof, wherein R$^1$, R$^4$, and R$^5$ can be the same or different;
R$^2$ is selected from the group consisting of an aryl group, a polyether and a spacer group;
R, R', and R$^3$ are selected from the group consisting of: hydrogens, alkyl groups, aryl groups, or combinations thereof, wherein R, R', and R$^3$ can be the same or different;
—B(OR$^3$)$_2$ is a boronic acid group;
n is a positive integer greater than or equal to one; and
introducing the treatment fluid into a subterranean formation.

38. A method of treating a subterranean formation comprising:
providing a viscosified treatment fluid that comprises water and a crosslinked gelling agent, the crosslinked gelling agent being formed by a reaction comprising a gelling agent and a boronic acid crosslinking agent comprising a compound having the formula:

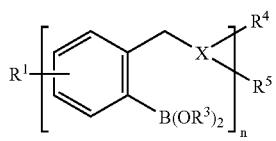

wherein
X can be a Lewis base;
R$^1$, R$^4$, and R$^5$ are selected from the group consisting of heteroatoms, organic fragments, or combinations thereof, wherein R$^1$, R$^4$, and R$^5$ can be the same or different;
—B(OR$^3$)$_2$ can be a boronic acid group;
R$^3$ can be hydrogen, an alkyl group, an aryl group, or a combination thereof; and
n is a positive integer greater than or equal to one; and introducing the treatment fluid into a subterranean formation.

39. A method of treating a subterranean formation comprising:
providing a viscosified treatment fluid that comprises water and a crosslinked gelling agent, the crosslinked gelling agent being formed by a reaction comprising a gelling agent and a boronic acid crosslinking agent comprising a compound having the formula:

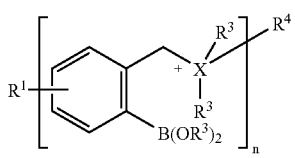

wherein
X can be a Lewis base;
R$^1$ and R$^4$ are selected from the group consisting of: heteroatoms, organic fragments, or combinations thereof, wherein R$^1$ and R$^4$ can be the same or different;
—B(OR$^3$)$_2$ can be a boronic acid group;
R$^3$ is selected from the group consisting of: a hydrogen, an alkyl group, an aryl group, or a combination thereof; and
n is a positive integer greater than or equal to one; and introducing the treatment fluid into a subterranean formation.

40. A method of treating a subterranean formation comprising:
providing a viscosified treatment fluid that comprises water and a crosslinked gelling agent, the crosslinked gelling agent being formed by a reaction comprising a gelling agent and a boronic acid crosslinking agent comprising a compound having the formula:

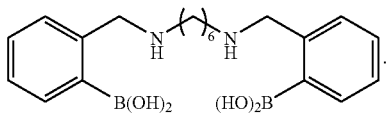

introducing the treatment fluid into a subterranean formation.

41. A viscosified treatment fluid comprising a reversibly crosslinked gelling agent, the crosslinked gelling agent being formed from a reaction comprising a gelling agent and a boronic acid crosslinking agent comprising a compound having the formula:

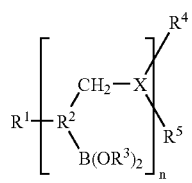

wherein
X is a Lewis base;
$R^1$, $R^4$, and $R^5$ are selected from the group consisting of: heteroatoms, organic fragments, or combinations thereof, wherein $R^1$, $R^4$, and $R^5$ can be the same or different;
$R^2$ is selected from the group consisting of an aryl group, a polyether and a spacer group;
R, R', and $R^3$ are selected from the group consisting of: hydrogens, alkyl groups, aryl groups, or combinations thereof, wherein R, R', and $R^3$ can be the same or different;
—$B(OR^3)_2$ is a boronic acid group; and
n is a positive integer greater than or equal to one.

42. A viscosified treatment fluid comprising a reversibly crosslinked gelling agent, the crosslinked gelling agent being formed from a reaction comprising a gelling agent and a boronic acid crosslinking agent comprising a compound having the formula:

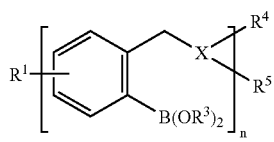

wherein
X is a Lewis base;
$R^1$, $R^4$, and $R^5$ are selected from the group consisting of: heteroatoms, organic fragments, or combinations thereof, wherein $R^1$, $R^4$, and $R^5$ can be the same or different;
—$B(OR^3)_2$ is a boronic acid group;
$R^3$ is selected from the group consisting of: a hydrogen, an alkyl group, an aryl group, or a combination thereof; and
n is a positive integer greater than or equal to one.

43. A viscosified treatment fluid comprising a reversibly crosslinked gelling agent, the crosslinked gelling agent being formed from a reaction comprising a gelling agent and a boronic acid crosslinking agent comprising a compound having the formula:

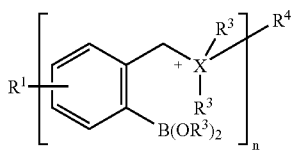

wherein
X is a Lewis base;
$R^1$ and $R^4$ are selected from the group consisting of: heteroatoms, organic fragments, or combinations thereof, wherein $R^1$ and $R^4$ can be the same or different;
—$B(OR^3)_2$ is a boronic acid group;
$R^3$ is selected from the group consisting of: a hydrogen, an alkyl group, an aryl group, or a combination thereof; and
n is a positive integer greater than or equal to one.

44. A viscosified treatment fluid comprising a crosslinked gelling agent, the crosslinked gelling agent being formed from a reaction comprising a gelling agent and a boronic acid crosslinking agent comprising a compound having the formula:

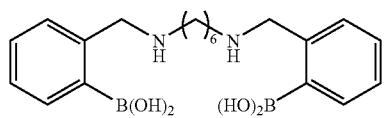

* * * * *